(12) United States Patent
Knapczyk et al.

(10) Patent No.: US 10,563,721 B2
(45) Date of Patent: Feb. 18, 2020

(54) HYDRAULIC DAMPER HAVING A HIGH FREQUENCY VALVE ASSEMBLY

(71) Applicant: BeijingWest Industries Co., Ltd., Beijing (CN)

(72) Inventors: Marcin Knapczyk, Cracow (PL); Karol Pilawski, Cracow (PL)

(73) Assignee: BEIJINGWEST INDUSTRIES CO., LTD, Beijing (CN)

(*) Notice: Subject to any disclaimer, the term of this patent is extended or adjusted under 35 U.S.C. 154(b) by 0 days.

(21) Appl. No.: 15/940,738

(22) Filed: Mar. 29, 2018

(65) Prior Publication Data

US 2018/0306266 A1    Oct. 25, 2018

Related U.S. Application Data

(60) Provisional application No. 62/489,275, filed on Apr. 24, 2017.

(51) Int. Cl.
| F16F 9/46 | (2006.01) |
| F16F 9/512 | (2006.01) |
| F16F 9/348 | (2006.01) |

(52) U.S. Cl.
CPC ............ *F16F 9/469* (2013.01); *F16F 9/3481* (2013.01); *F16F 9/5126* (2013.01)

(58) Field of Classification Search
CPC ......... F16F 9/3481; F16F 9/469; F16F 9/5126
See application file for complete search history.

(56) References Cited

U.S. PATENT DOCUMENTS

| 4,964,493 | A | 10/1990 | Yamaura et al. |
| 5,921,360 | A * | 7/1999 | Moradmand ........... F16F 9/512 188/283 |
| 6,085,876 | A | 7/2000 | Deferme |
| 7,097,016 | B2 | 8/2006 | Deferme |
| 7,395,907 | B2 | 7/2008 | de Kock et al. |
| 9,086,111 | B2 | 7/2015 | Kim |
| 9,194,457 | B2 | 11/2015 | Kim |
| 9,200,693 | B2 | 12/2015 | Lim |
| 9,249,854 | B2 | 2/2016 | Kim |
| 9,441,700 | B2 | 9/2016 | Nowaczyk et al. |
| 9,541,153 | B2 | 1/2017 | Park |
| 9,543,653 | B2 | 1/2017 | Kim |
| 9,611,915 | B2 | 4/2017 | Park |
| 9,631,695 | B2 | 4/2017 | De Kock |

(Continued)

FOREIGN PATENT DOCUMENTS

| CN | 100352920 C | 6/2005 |
| CN | 1871453 A | 11/2006 |

(Continued)

OTHER PUBLICATIONS

Extended European Search Report dated Oct. 9, 2018 for counterpart European patent application No. EP18168750.0.

(Continued)

*Primary Examiner* — Melody M Burch
(74) *Attorney, Agent, or Firm* — William H. Honaker; Dickinson Wright PLLC (57) ABSTRACT

A hydraulic damper including a high frequency valve assembly for reducing the level of damping force provided by the hydraulic damper during a rebound stroke during high frequency and/or low amplitude events.

16 Claims, 5 Drawing Sheets

(56) References Cited

U.S. PATENT DOCUMENTS

| | | | |
|---|---|---|---|
| 2005/0045440 A1 | 3/2005 | Kock et al. | |
| 2009/0084647 A1 | 4/2009 | Maneyama | |
| 2014/0048365 A1* | 2/2014 | Kim | F16F 9/34 |
| | | | 188/322.13 |
| 2014/0048366 A1 | 2/2014 | Lee et al. | |
| 2015/0041269 A1* | 2/2015 | Lim | F16F 9/3485 |
| | | | 188/322.15 |
| 2015/0152936 A1 | 6/2015 | Kim | |
| 2015/0152938 A1* | 6/2015 | Park | F16F 9/5126 |
| | | | 188/280 |
| 2016/0025181 A1 | 1/2016 | Nowaczyk et al. | |
| 2016/0280031 A1 | 9/2016 | Tsukahara et al. | |
| 2016/0288604 A1 | 10/2016 | Teraoka et al. | |

FOREIGN PATENT DOCUMENTS

| | | |
|---|---|---|
| CN | 101809312 A | 8/2010 |
| CN | 105452708 A | 3/2016 |
| DE | 102015205556 | 10/2015 |
| KR | 20120025899 A | 3/2012 |
| KR | 1020120025899 | 3/2012 |

OTHER PUBLICATIONS

First Office Action and search report dated Jul. 25, 2019 for counterpart Chinese patent application No. 201810324032.5, along with machine EN translation.

* cited by examiner

HYDRAULIC DAMPER HAVING A HIGH FREQUENCY VALVE ASSEMBLY

CROSS-REFERENCE TO RELATED APPLICATIONS

This application claims the benefit of U.S. Provisional Patent Application Ser. No. 62/489,275 filed on Apr. 24, 2017, and titled "Hydraulic Damper Having a High Frequency Valve Assembly," the entire disclosure of which is hereby incorporated by reference.

FIELD OF THE INVENTION

A hydraulic damper for a vehicle suspension system. More particularly, a hydraulic damper including a high frequency valve assembly for reducing the level of damping force provided by the hydraulic damper during high frequency and/or low amplitude events.

DESCRIPTION OF THE PRIOR ART

Hydraulic dampers are known in the art for use on suspension systems of vehicles such as automobiles. Typically, hydraulic dampers include a rod and piston contained within a fluid-filled tube. Suspension movements transmitted to the rod and piston are dampened as the damper compresses and rebounds. Damping forces are generated within the tube by fluid friction forces that oppose movement of the rod and piston.

It is known in the art for hydraulic dampers to include a frequency dependent or amplitude sensitive valve assembly to provide the damper with the ability to reduce the level of damping force for high frequency or low amplitude events to provide better comfort and road holding for occupants. However, known valve assemblies are generally expensive, complex and have limited tunability capabilities. Accordingly, an improved hydraulic damper is desired.

SUMMARY OF THE INVENTION

According to an aspect of the disclosure, a hydraulic damper assembly is provided. The hydraulic damper assembly includes a tube that extends about and along an axis and defines a chamber. A main piston is slideably disposed in the tube and divides the tube into a compression section and a rebound section. The main piston is moveable in a compression stroke toward the compression section and a rebound stroke toward the rebound section. The main piston has an upper end that faces the rebound section of the chamber, and a lower end that faces the compression section of the chamber. A rod is connected to and extends through the main piston in the compression and rebound chambers. The main piston defines a compression passage that extends between the upper and lower ends of the main piston and fluidly connects the compression and rebound sections. A compression valve overlies the compression passage at the upper end of the main piston for allowing fluid to pass from the compression section to the rebound section during a compression stroke of the main piston while preventing fluid from passing from the rebound section to the compression section through the compression passage. The piston further defines a rebound passage that extends between the lower and upper ends of the main piston and fluidly connects the compression and rebound sections. A rebound valve overlies the rebound passage at the lower end of the main piston for allowing fluid to pass from the rebound section to the compression section during a rebound stroke of the main piston while preventing fluid from passing from the compression section to the rebound section through the rebound passage. A supplemental housing is disposed about the rod in said compression section and disposed axially against said rebound valve and defining a compartment and axially moveable relative to said rod. A spring biases the supplemental housing toward said rebound valve. A high frequency piston is fixed relative to the rod inside the supplemental housing and separates the compartment into a bottom segment and a top segment, and defines at least one high frequency passage fluidly connecting the top segment and the bottom segment. A high frequency valve overlies the high frequency passage on the bottom face of the high frequency piston and allows fluid to pass through the high frequency passage from the top segment to the bottom segment while substantially inhibiting fluid from passing from the bottom segment to the top segment to axially move the housing away from the rebound valve to provide a reduction of damping force during high frequency vibrations or low amplitude events.

Accordingly, during operation of the hydraulic damper, the high frequency valve assembly reduces the level of damping force provided by the hydraulic damper during high frequency and/or low amplitude events. More particularly, the high frequency valve assembly allows for free movement of the supplemental housing when the high frequency disc stack opens, and restricts movement of the supplemental housing in the opposite direction. Accordingly, at high frequency and/or low amplitudes the level of damping force is reduced due to the supplemental housing not being biased against the rebound valve.

According to another aspect of the disclosure, the high frequency valve defines at least one opening allowing fluid to flow from the bottom segment to the top segment. According to this aspect, the level of restriction on the high frequency piston is tunable by varying the size of the opening, and could be used to define proper frequency of operation.

In accordance with the above, the subject high frequency valve assembly has a low cost and non-complex design that provides improved performance over conventional high frequency valve devices.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
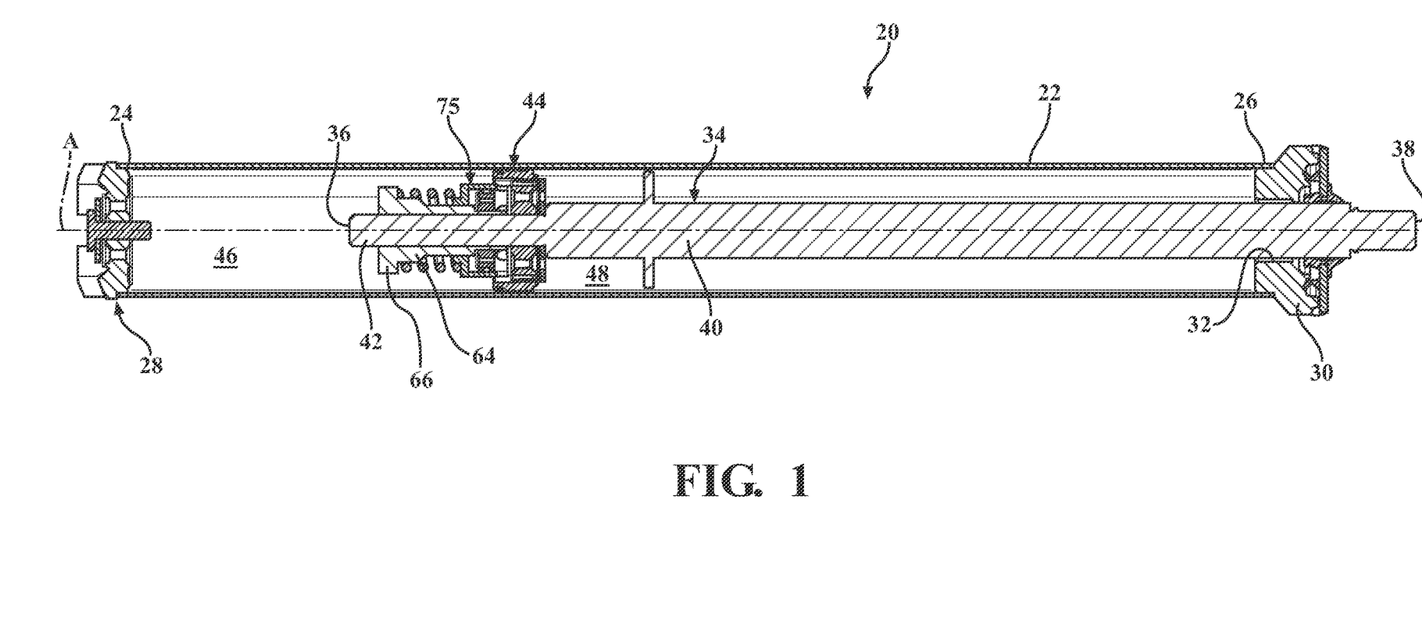
FIG. 1 is a side cutaway view of an example embodiment of a hydraulic damper including a high frequency valve assembly according to an aspect of the disclosure.

Referring to the Figures, wherein like numerals indicate corresponding parts throughout the several views, a hydraulic damper 20 for a vehicle suspension system is generally shown in FIG. 1. It should be appreciated that the subject hydraulic damper 20 may be utilized on suspension systems of various vehicles including, but not limited to, automobiles, motorcycles and recreational vehicles.

The hydraulic damper 20 includes a tube 22 that is disposed about and extends along an axis A between a bottom end 24 and a top end 26. The tube 22 defines a chamber 46, 48. A lower valve assembly 28 is disposed at, and closes the bottom end 24 of the tube 22. A rod guide 30 is disposed at, and closes the top end 26 of the tube 22. The rod guide 30 defines a rod passage 32 along the axis A. A rod 34 is axially slideably disposed along the axis A and extends between a first end 36 inside the chamber 46, 48 and a second end 38 outside of the chamber 46, 48. The rod 34 extends through the rod passage 32. The rod 34 has a main portion 40 that extends from the second end 38 toward the first end 36, and a tenon portion 42 that extends from the main portion 40 to the first end 36. The main portion 40 has a diameter that is greater than a diameter of the tenon portion 42.

A main piston 44 is fixed about the tenon portion 42 of the rod 34 and divides the chamber 46, 48 of the tube 22 into a compression section 46 between the lower valve assembly 28 and the main piston 44, and a rebound section 48 between the rod guide 30 and the main piston 44. The main piston 44 and rod 34 are moveable in a compression stroke in which the main piston 44 moves toward the bottom end 24 of the tube 22, and a rebound stroke in which the piston moves toward the top end 26 of the tube 22.

Figure 2:
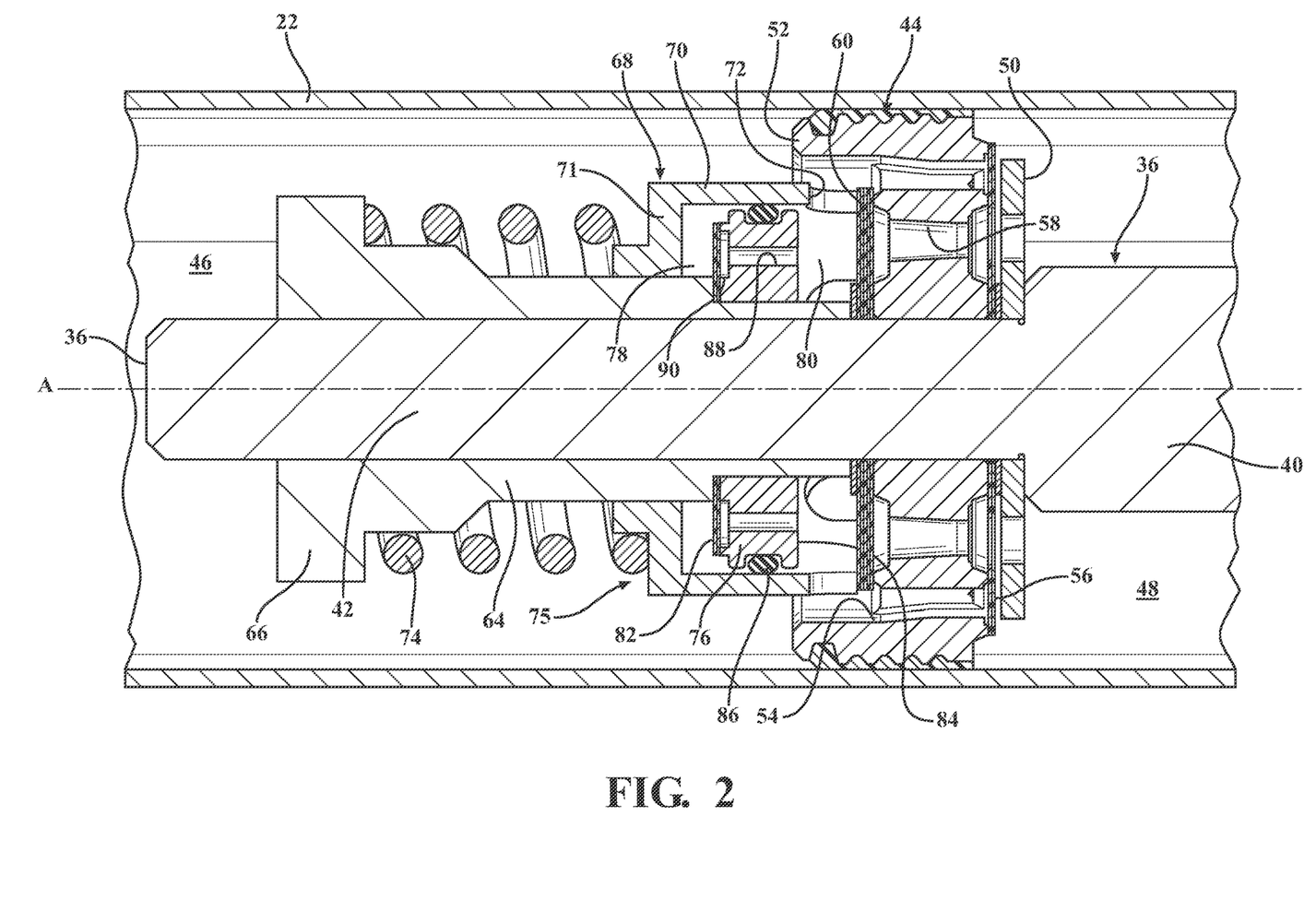
FIG. 2 is a magnified view of the high frequency valves assembly of FIG. 1.

As best illustrated in FIG. 2, the main piston 44 has an upper end 50 in the rebound section 48 of the chamber 46, 48 and a lower end 52 in the compression section 46 of the chamber 46, 48. The main piston 44 defines at least one compression passage 54 that extends between the upper and lower ends 50, 52 and fluidly connects the compression and rebound sections 46, 48. A flexible compression valve 56 overlies the compression passage 54 at the upper end 50 of the main piston 44. The compression valve 56 allows fluid to pass from the compression section 46 to the rebound section 48 during the compression stroke of the main piston 44 in response to a predetermined force being applied to the compression valve 56, and prevents fluid from passing through the compression passage 54 from the rebound section 48 to the compression section 46. According to the example embodiment, the compression valve 56 is a compression disc stack 56, however, other types of valves may be utilized. It should be appreciated that the thickness and material of the compression valve 56 may be selected to provide desired movement in response to a predetermined force depending on particular applications.

The main piston 44 further defines at least one rebound passage 58 that extends between the upper and lower ends 50, 52 and fluidly connects the compression and rebound sections 46, 48. A flexible rebound valve 60 overlies the rebound passage 58 at the lower end 52 of the main piston 44. The rebound valve 60 allows fluid to pass from the rebound section 48 to the compression section 46 during a rebound stroke of the main piston 44 in response to a predetermined force being applied to the rebound valve 60, and prevents fluid from passing through the rebound passage 58 from the compression section 46 to the rebound section 48. According to the example embodiment, the rebound valve 60 is a rebound disc stack 60, however, other types of valves may be utilized. Like the compression valve 56, the thickness and material of the rebound valve 60 may be selected to provide desired movement in response to a predetermined force depending on particular applications.

A shoulder nut 64, 66 is disposed about and fixed to the tenon portion 42 of the rod 34. In the example embodiment, the shoulder nut 64, 66 and tenon portion 42 are threadedly connected to one another, however, it should be appreciated that they could be connected to one another in other ways. The shoulder nut 64, 66 includes a sheath portion 64 that extends substantially axially, and a flange portion 66 that extends radially outwardly relative to the sheath portion 64 adjacent to the first end 36 of the rod 34.

A high frequency valve assembly 75 is provided for reducing the level of damping force provided by the hydraulic damper 20 during high frequency and/or low amplitude events. The high frequency valve assembly 75 includes a supplemental housing 68 disposed about the sheath portion 64 of the shoulder nut 64, 66. The supplemental housing 68 is axially moveable along the sheath portion 64 in the compression section 46. The supplemental housing 68 is generally cup-shaped and has an axially-extending outer wall 70, and a radial wall 71 extending radially inwardly from the outer wall 70 to the shoulder nut 64, 66. The supplemental housing 68 defines a compartment 78, 80 between the outer wall 70, radial wall 71 and the sheath portion 64. The outer wall 70 of the supplemental housing 68 defines a plurality of radial passages 72 that fluidly connects the compression section 46 to the compartment 78, 80 of the supplemental housing 68. It should be appreciated that only one, or more radial passages 72 could be defined by the outer wall 70. A rebound valve spring 74 extends between the supplemental housing 68 and the flange portion 66 of the shoulder nut 64, 66 and biases the supplemental housing 68 axially toward the rebound valve 60, thus resisting the flow of fluid through the rebound valve 60.

The high frequency valve assembly 75 also includes a high frequency piston 76 disposed about and fixed to sheath portion 64 in the compartment 78, 80 of the supplemental housing 68 and axially separates the compartment into a bottom segment 78 and a top segment 80. The high frequency piston 76 extends axially between a bottom face 82 that faces away from the main piston 44 in the bottom segment 78, and a top face 84 that faces the main piston 44 in the top segment 80. A seal 86 is disposed radially between the high frequency piston 76 and the supplemental housing 68 for preventing fluids from passing between the high frequency piston 76 and the supplemental housing 68.

The high frequency piston 76 defines a plurality of high frequency passages 88 that extend between the bottom and top faces 82, 84. It should be appreciated that more, or only one high frequency passages 88 could be provided. A flexible high frequency valve 91, 93 overlies the high frequency passages 88 on the bottom face 82 of the high frequency piston 76. The high frequency valve 91, 93 allows fluid to pass through the high frequency passages 88 from the top segment 80 into the bottom segment 78 of the compartment of the supplemental housing 68 during the rebound stroke of the piston in response to a predetermined force being applied thereto, and inhibits fluid from passing through the high frequency passage 88 from the bottom segment 78 to the top segment 80. In the example embodiment, the high frequency valve 91, 93 is a high frequency disc stack 91, 93. More particularly, the high frequency disc stack 91, 93 includes at least a first disc 91 of flexible material overlying the bottom face 82 of the high frequency piston 76 and a second disc 93 of flexible material overlying the first disc 91.

Figure 3:
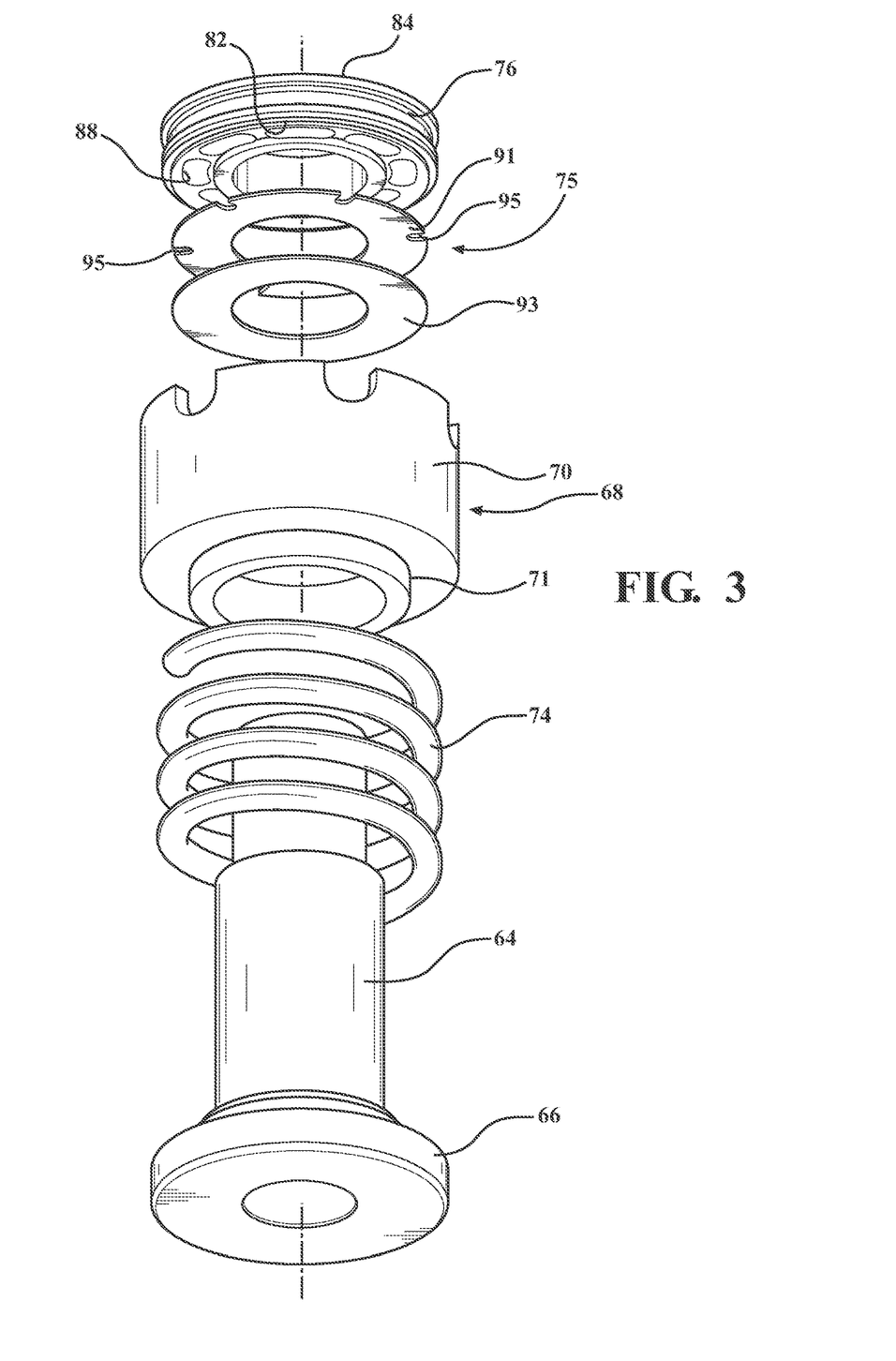
FIG. 3 is an exploded perspective view of the supplemental housing, high frequency piston, high frequency valve, shoulder nut and spring.
Figure 4:
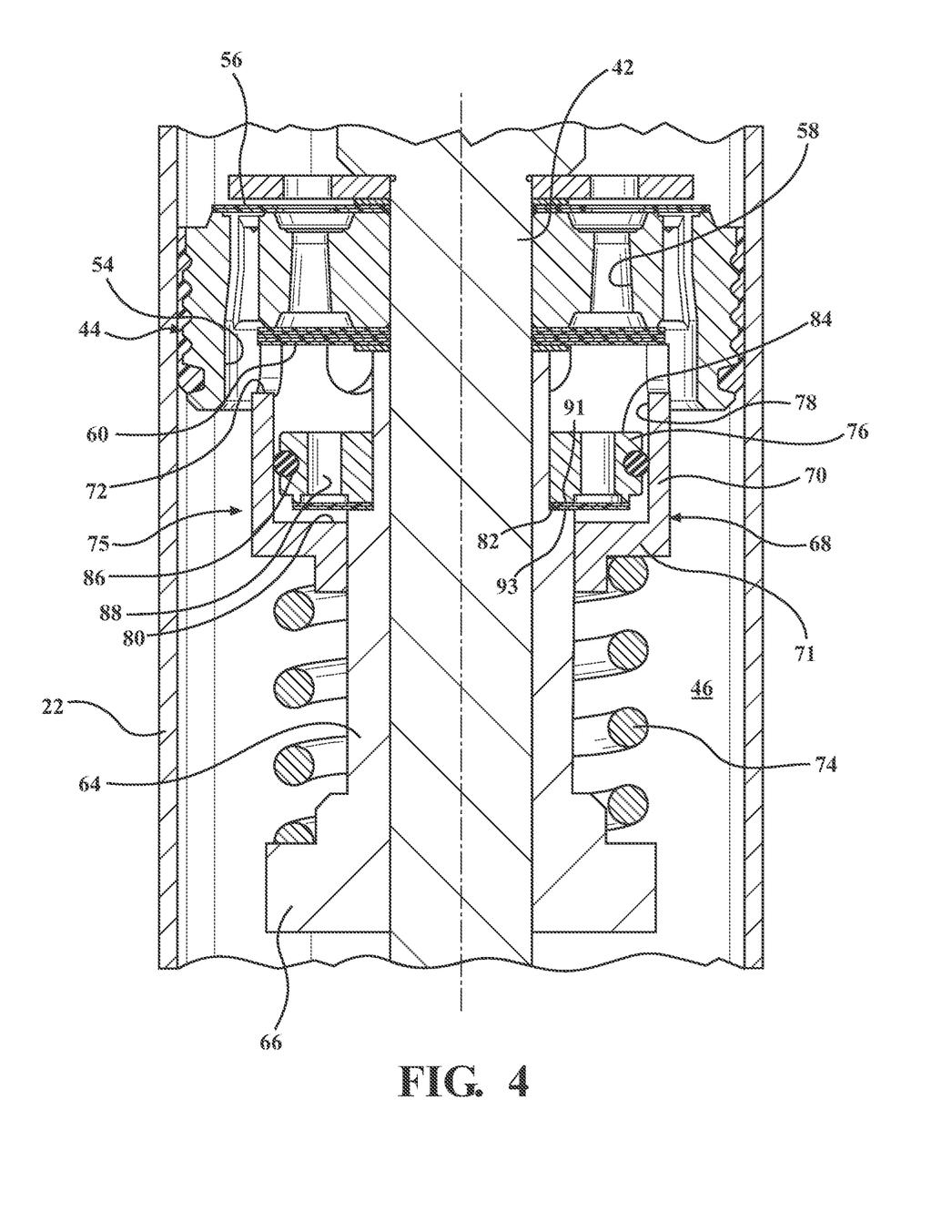
FIG. 4 is a magnified cutaway view of the supplemental housing in a first position in which fluid is not present a bottom section of the supplemental housing.
Figure 5:
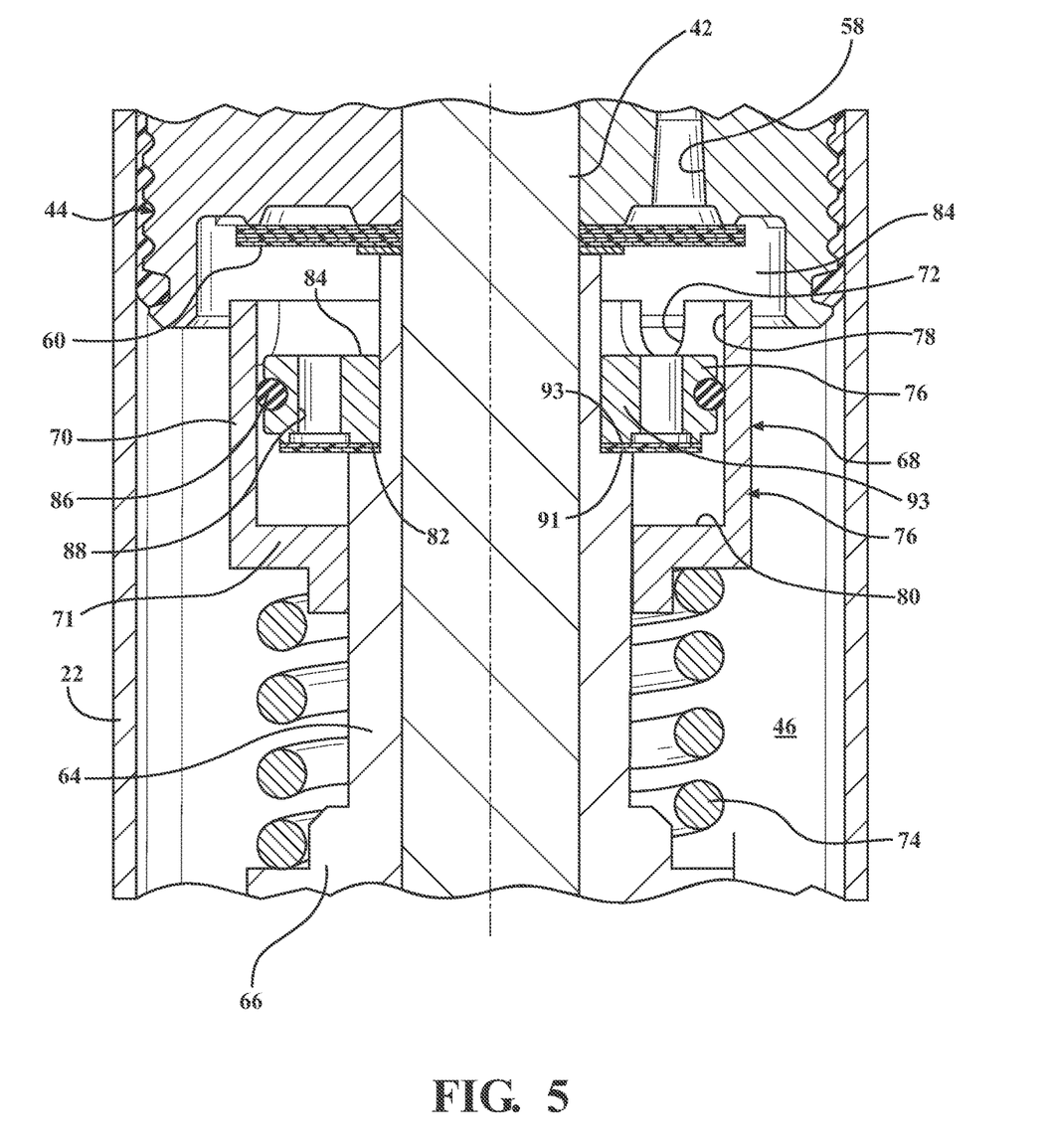
FIG. 5 is a magnified cutaway view of the supplemental housing in a second position in which fluid is present in the bottom section of the supplemental housing, thus compressing the spring.

As best shown in FIGS. 3-5, the first disc 91 defines a plurality of openings 95 extending radially inwardly from an outer circumference 95 of the first disc 91 for allowing a limited amount of fluid to pass from the bottom segment 78 into the top segment 80 of the compartment of the supplemental housing 68 through the high frequency passage 88 and the openings 95. The openings 95 are arranged in equally circumferentially spaced relationship with one another to provide a balanced outflow through the openings 95 and to reduce wear on the first and second discs 91, 93. A first width of the opening 95 is smaller than a second width of the high frequency passage 88 to limit the flow rate of fluids passing through the openings 95. Six openings 95 are provided in the example embodiment, however it should be appreciated that other numbers of openings 95 may be utilized. Like the compression and rebound valves 56, 60, the thickness and material of the first and second disc 91, 93 may be selected to provide a desired movement in response to a predetermined force depending on the particular application.

During operation of the hydraulic damper 20, the damping force at high stroking frequencies and/or low amplitudes during the rebound stroke is reduced due to the presence of the high frequency valve assembly 75. More specifically, during the rebound stroke, the main rebound valve disc stack 60 opens and forces the supplemental housing 68 to move down and compress the spring 74. The high frequency disc stack 91, 93 opens, thus allowing fluid into the bottom segment 78 of the compartment 78, 80. Meanwhile, when rebound stroke velocity begins to drop, the high frequency valve 91, 93 limits the flow of fluid from the bottom segment 78 to the top segment 80. The fluid in the bottom segment 78 causes a build-up of pressure, thus forcing the supplemental housing 68 axially against the rebound valve spring 74, as shown in FIG. 5, thus reducing the force applied by the supplemental housing 68 against the rebound valve spring 74, thereby reducing the damper force provided by the hydraulic damper 20 during the rebound stroke. Movement of the supplemental housing 68 in the opposite direction back to its original position shown in FIG. 4 is slowed due to the high frequency valve 91, 93 limiting the passage of fluid from the bottom segment 78 to the top segment 80.

Because the openings 95 of the high frequency valve assembly 75 only allow fluid to slowly flow from the bottom segment 78 to top segments 80, the rebound valve spring 74 remains compressed for a predetermined period of time. During this situation, the damping force provided by the high frequency piston 76 at high frequency and/or low amplitude vibrations the level of damping force is reduced due to the rebound valve spring 74 slowly returning to its normal position.

It should be appreciated that the level of restriction on the high frequency piston 76 is tunable based on the size and number of openings 95 on the first disc 91, and can be used to define proper frequency of operation. In order to provide an increased return time of the rebound valve spring 74, more openings 95 can be utilized or the openings 95 be made larger. On the other hand, in order to provide a decreased return time of the rebound valve spring 74, fewer openings 95 can be utilized, or the openings can be made smaller.

It should be appreciated that the subject high frequency valve assembly 75 provides a lower cost and less complex design than prior art valve assemblies to provide a high frequency and/or low displacement damping force, while also providing performance advantages. Acting on only the rebound valve spring 74 helps to improve comfort without deteriorating other vehicle performance attributes. It should be appreciated that the high frequency valve assembly 75 may advantageously be utilized on twin tube and monotube dampers with "+" type of valves. It should also be appreciated the level of damping force at low stroking frequency is substantially defined by the rebound valve 60 and rebound valve spring 74, and thus remains largely unaffected by the subject invention.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic damper assembly including:
   a tube extending about and along an axis and defining a chamber;
   a main piston slideably disposed in said tube and dividing said tube into a compression section and a rebound section and moveable in a compression stroke toward said compression section and a rebound stroke toward said rebound section;
   said main piston having an upper end facing said rebound section of said chamber and a lower end facing said compression section of said chamber;
   a rod connected to and extending through said main piston in said compression and rebound sections;
   said main piston defining a compression passage extending between said upper and lower ends of said main piston and fluidly connecting said compression and rebound sections;
   a compression valve overlying said compression passage at said upper end of said main piston for allowing fluid to pass from said compression section to said rebound section during a compression stroke of said main piston while preventing fluid from passing from said rebound section to said compression section through said compression passage;
   said main piston further defining a rebound passage extending between said lower and upper ends of said main piston and fluidly connecting said compression and rebound sections;
   a rebound valve overlying said rebound passage at said lower end of said main piston for allowing fluid to pass from said rebound section to said compression section during a rebound stroke of said main piston while preventing fluid from passing from said compression section to said rebound section through said rebound passage;
   a supplemental housing disposed about said rod in said compression section and disposed axially against said rebound valve and defining a compartment and axially moveable relative to said rod;
   a spring biasing said supplemental housing toward said rebound valve;
   a high frequency piston fixed relative to said rod inside said supplemental housing and separating said compartment into a bottom segment and a top segment and defining at least one high frequency passage fluidly connecting said top segment and said bottom segment;

a high frequency valve overlying said high frequency passage on a bottom face of said high frequency piston and allowing fluid to pass through said high frequency passage from said top segment to said bottom segment while substantially inhibiting fluid from passing from said bottom segment to said top segment to axially move said supplemental housing away from said rebound valve to provide a reduction of damping force during high frequency vibrations or low amplitude events; and a seal positioned radially between said high frequency piston and said supplemental housing for preventing fluids from passing between said high frequency piston and said supplemental housing.

2. The hydraulic damper assembly as set forth in claim 1 wherein said high frequency valve defines at least one opening for allowing fluid to pass from said bottom segment to said top segment through said at least one high frequency passage.

3. The hydraulic damper assembly as set forth in claim 2 wherein a first width of said at least one opening is smaller than a second width of said at least one high frequency passage.

4. The hydraulic damper assembly as set forth in claim 2 wherein said high frequency valve is a high frequency disk stack including at least a first disc of flexible material disposed against said bottom face of said high frequency piston, and a second disc of flexible material overlying said first disc.

5. The hydraulic damper assembly as set forth in claim 4 wherein said first disc of said high frequency valve has an outer circumference and wherein said first disc defines said at least one opening extending radially inwardly from said outer circumference in alignment with said high frequency passage.

6. The hydraulic damper assembly as set forth in claim 5 wherein said at least one high frequency passage includes a plurality of high frequency passages, and wherein said at least one opening of said first disc includes a plurality of openings each aligned with one of said high frequency passages.

7. The hydraulic damper assembly as set forth in claim 6 wherein said plurality of high frequency passages are evenly circumferentially spaced from one another, and wherein said plurality of openings of said first disc are evenly circumferentially spaced from one another.

8. The hydraulic damper assembly as set forth in claim 6 wherein said plurality of high frequency passages includes nine high frequency passages.

9. The hydraulic damper assembly as set forth in claim 6 wherein said plurality of openings includes six openings.

10. The hydraulic damper assembly as set forth in claim 1 wherein said supplemental housing includes an outer wall extending axially and a radial wall extending radially inwardly from said outer wall to a shoulder nut.

11. The hydraulic damper assembly as set forth in claim 10 wherein said outer wall of said supplemental housing defines at least one radial passage fluidly connecting said compression section of said chamber to said compartment of said supplemental housing.

12. The hydraulic damper assembly as set forth in claim 11 wherein said outer wall of said at least one supplemental housing includes a plurality of radial passages circumferentially spaced from one another.

13. The hydraulic damper assembly as set forth in claim 1 wherein a shoulder nut is fixed about said rod in said compression section, and wherein said shoulder nut includes a sheath portion extending axially and a flange portion extending radially outwardly from said sheath portion, and wherein said supplemental housing and said high frequency piston are positioned about said sheath portion of said shoulder nut, and wherein said spring extends between said flange portion and said supplemental housing.

14. A hydraulic damper assembly including:

a tube extending about and along an axis and defining a chamber;

a main piston slideably disposed in said tube and dividing said tube into a compression section and a rebound section and moveable in a compression stroke toward said compression section and a rebound stroke toward said rebound section;

said main piston having an upper end facing said rebound section of said chamber and a lower end facing said compression section of said chamber;

a rod connected to and extending through said main piston in said compression and rebound sections;

said main piston defining a compression passage extending between said upper and lower ends of said main piston and fluidly connecting said compression and rebound sections;

a compression valve overlying said compression passage at said upper end of said main piston for allowing fluid to pass from said compression section to said rebound section during a compression stroke of said main piston while preventing fluid from passing from said rebound section to said compression section through said compression passage;

said main piston further defining a rebound passage extending between said lower and upper ends of said main piston and fluidly connecting said compression and rebound sections;

a rebound valve overlying said rebound passage at said lower end of said main piston for allowing fluid to pass from said rebound section to said compression section during a rebound stroke of said main piston while preventing fluid from passing from said compression section to said rebound section through said rebound passage;

a supplemental housing disposed about said rod in said compression section and disposed axially against said rebound valve and defining a compartment and axially moveable relative to said rod;

a spring biasing said supplemental housing toward said rebound valve;

a high frequency piston fixed relative to said rod inside said supplemental housing and separating said compartment into a bottom segment and a top segment and defining at least one high frequency passage fluidly connecting said top segment and said bottom segment; and a high frequency valve overlying said high frequency passage on a bottom face of said high frequency piston and allowing fluid to pass through said high frequency passage from said top segment to said bottom segment while substantially inhibiting fluid from passing from said bottom segment to said top segment to axially move said supplemental housing away from said rebound valve to provide a reduction of damping force during high frequency vibrations or low amplitude events;

wherein said supplemental housing includes an outer wall extending axially and a radial wall extending radially inwardly from said outer wall to a shoulder nut;

wherein said outer wall of said supplemental housing defines at least one radial passage fluidly connecting said compression section of said chamber to said compartment of said supplemental housing.

15. The hydraulic damper assembly as set forth in claim 14, wherein said outer wall of said supplemental housing includes a plurality of radial passages circumferentially spaced from one another.

16. A hydraulic damper assembly including:

a tube extending about and along an axis and defining a chamber;

a main piston slideably disposed in said tube and dividing said tube into a compression section and a rebound section and moveable in a compression stroke toward said compression section and a rebound stroke toward said rebound section;

said main piston having an upper end facing said rebound section of said chamber and a lower end facing said compression section of said chamber;

a rod connected to and extending through said main piston in said compression and rebound sections;

said main piston defining a compression passage extending between said upper and lower ends of said main piston and fluidly connecting said compression and rebound sections;

a compression valve overlying said compression passage at said upper end of said main piston for allowing fluid to pass from said compression section to said rebound section during a compression stroke of said main piston while preventing fluid from passing from said rebound section to said compression section through said compression passage;

said main piston further defining a rebound passage extending between said lower and upper ends of said main piston and fluidly connecting said compression and rebound sections;

a rebound valve overlying said rebound passage at said lower end of said main piston for allowing fluid to pass from said rebound section to said compression section during a rebound stroke of said main piston while preventing fluid from passing from said compression section to said rebound section through said rebound passage;

a supplemental housing disposed about said rod in said compression section and disposed axially against said rebound valve and defining a compartment and axially moveable relative to said rod;

a spring biasing said supplemental housing toward said rebound valve;

a high frequency piston fixed relative to said rod inside said supplemental housing and separating said compartment into a bottom segment and a top segment and defining at least one high frequency passage fluidly connecting said top segment and said bottom segment; and a high frequency valve overlying said high frequency passage on a bottom face of said high frequency piston and allowing fluid to pass through said high frequency passage from said top segment to said bottom segment while substantially inhibiting fluid from passing from said bottom segment to said top segment to axially move said supplemental housing away from said rebound valve to provide a reduction of damping force during high frequency vibrations or low amplitude events;

wherein a shoulder nut is fixed about said rod in said compression section, and wherein said shoulder nut includes a sheath portion extending axially and a flange portion extending radially outwardly from said sheath portion, and wherein said supplemental housing and said high frequency piston are positioned about said sheath portion of said shoulder nut, and wherein said spring extends between said flange portion and said supplemental housing.

* * * * *